(12) United States Patent
Bhan et al.

(10) Patent No.: US 7,556,729 B2
(45) Date of Patent: Jul. 7, 2009

(54) METHOD FOR THE SELECTIVE HYDRODESULFURIZATION OF AN OLEFIN CONTAINING HYDROCARBON FEEDSTOCK

(75) Inventors: Opinder Kishan Bhan, Katy, TX (US); Paul Benjerman Himelfarb, Houston, TX (US)

(73) Assignee: Shell Oil Company, Houston, TX (US)

( * ) Notice: Subject to any disclaimer, the term of this patent is extended or adjusted under 35 U.S.C. 154(b) by 339 days.

(21) Appl. No.: 11/409,667

(22) Filed: Apr. 24, 2006

(65) Prior Publication Data

US 2006/0237345 A1 Oct. 26, 2006

Related U.S. Application Data

(60) Provisional application No. 60/674,887, filed on Apr. 26, 2005.

(51) Int. Cl.
*C10G 45/04* (2006.01)
(52) U.S. Cl. ............... 208/213; 208/216 R; 208/217
(58) Field of Classification Search ............... 208/213, 208/216 R, 217
See application file for complete search history.

(56) References Cited

U.S. PATENT DOCUMENTS

| 5,266,188 | A | 11/1993 | Kukes et al. | 208/216 R |
|---|---|---|---|---|
| 5,286,373 | A | 2/1994 | Sudhakar et al. | 208/216 R |
| 5,686,375 | A | 11/1997 | Iyer et al. | 502/315 |
| 5,906,731 | A | 5/1999 | Abdo et al. | 208/216 R |
| 6,013,598 | A | 1/2000 | Lapinski et al. | 502/305 |
| 6,126,814 | A | 10/2000 | Lapinski et al. | 208/217 |
| 6,589,418 | B2 | 7/2003 | Brignac et al. | 208/216 |
| 2003/0183556 | A1 | 10/2003 | Halbert et al. | 208/216 |
| 2005/0014639 | A1 | 1/2005 | Bhan et al. | 502/313 |

FOREIGN PATENT DOCUMENTS

| GB | 1123136 | 8/1968 |
|---|---|---|
| WO | WO03052031 | 6/2003 |
| WO | WO2004112959 | 12/2004 |

*Primary Examiner*—Tam M Nguyen
(74) *Attorney, Agent, or Firm*—Charles W. Stewart

(57) ABSTRACT

Described is a method for the selective hydrodesulfurization of an olefin-containing hydrocarbon feedstock that uses a catalyst composition having a high content of a nickel component and an effective but small amount of a molybdenum component supported on a porous refractory oxide. A preferred catalyst composition contains an immaterial amount of a cobalt component.

9 Claims, 1 Drawing Sheet

US 7,556,729 B2

Figure 1:
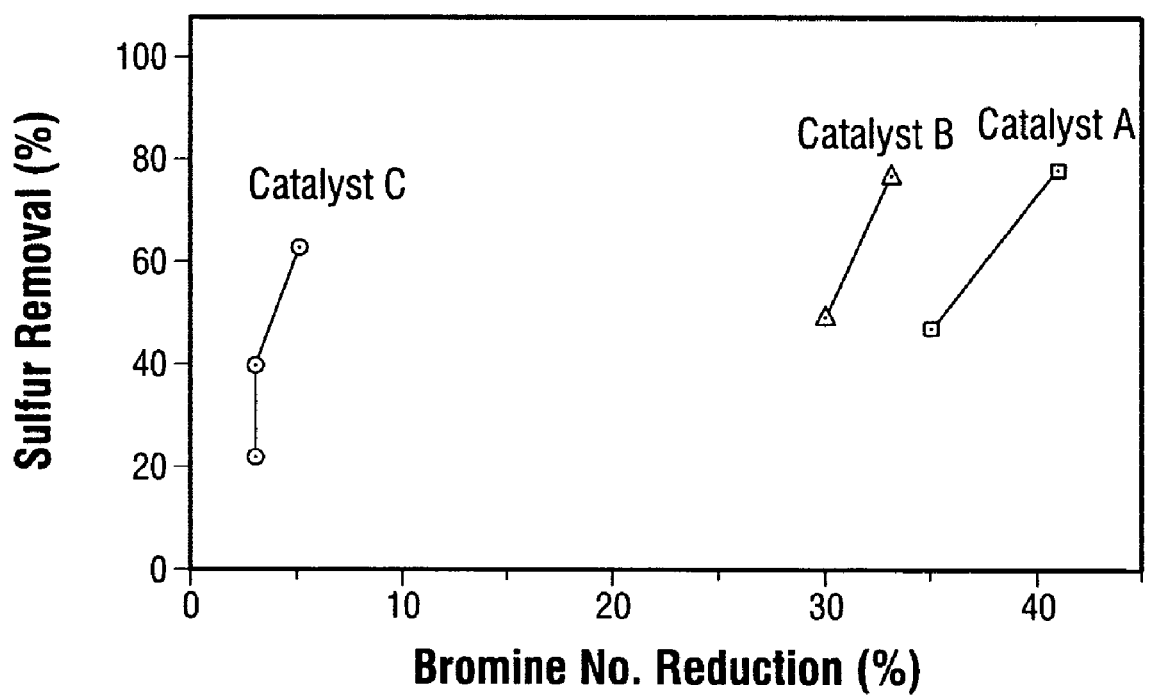

METHOD FOR THE SELECTIVE HYDRODESULFURIZATION OF AN OLEFIN CONTAINING HYDROCARBON FEEDSTOCK

This application claims the benefit of U.S. Provisional Application No. 60/674,887 filed Apr. 26, 2005, the entire disclosure of which is hereby incorporated by reference.

This invention relates to the selective hydrodesulfurization of an olefin containing hydrocarbon feedstock.

Gasoline regulations are increasingly creating a need to treat various refinery streams and products, for example, cracked gasoline blending material, including coker naphtha and gasoline from a catalytic cracking unit, to remove undesirable sulfur that is contained in such refinery streams and products.

One means by which sulfur may be removed from hydrocarbon streams that contain olefin compounds is through the use of various of the known catalytic hydroprocessing methods. A problem with the use of such catalytic hydroprocessing methods is that they typically tend to hydrogenate the olefin compounds as well as the sulfur compounds contained in the hydrocarbon feed stream being treated. When the hydrocarbon feed stream is to be used as a gasoline-blending component, usually the presence of the olefins is desirable due to their relatively high-octane values and octane contribution to the gasoline pool.

Cracked gasoline blending material typically contains high concentrations of high-octane olefin compounds as well as concentrations of sulfur compounds. It is desirable to be able to catalytically desulfurize the cracked gasoline blending materials with a minimum of hydrogenation of the olefins contained in them. Disclosed in the prior art are many types of hydroprocessing catalysts and processes, and the prior art even discloses processes for the selective hydrodesulfurization of olefin containing hydrocarbon feedstocks.

U.S. Pat. No. 5,266,188 is one patent that discloses a process for the selective hydrotreating of a cracked naphtha using a catalyst comprising a Group VIB metal component, a Group VIII metal component, a magnesium component, and an alkali metal component. The Group VIB metal component is present in the catalyst in an amount in the range of from about 4 wt % to about 20 wt %, and the Group VIII metal component is present in the range of from about 0.5 wt % to about 10 wt %, both calculated as oxides and based on the total catalyst weight. The preferred Group VIB metals are molybdenum and tungsten with molybdenum being preferred among these, and the preferred Group VIII metals are cobalt and nickel with cobalt being preferred among these.

U.S. Pat. No. 5,686,375 discloses a hydroprocessing catalyst that contains an overlayer of a Group VIB metal (preferably molybdenum) component on a support comprising an underbedded Group VIII metal (preferably nickel) component combined with a porous refractory oxide. The catalyst typically contains greater than 3.0, preferably greater than 4.0, and most preferably greater than 4.5 weight percent of Group VIII metal component (calculated as the monoxide) and greater than 10, and preferably greater than 17 weight percent of Group VIB metal component (calculated as the trioxide). A preferred catalyst is essentially free of supported metal components other than molybdenum and underbedded nickel. A most highly preferred embodiment of the catalyst contains above 3 weight percent of nickel components, including underbedded nickel components encompassing at least 4.5 weight percent of the support. The catalyst is used in hydroprocessing methods such as desulfurization and denitrogenation, but there is no indication that the process is selective to desulfurization.

U. S. Patent Publication No. 2003/0183556 A1 discloses a process for the selective hydrodesulfurization of naphtha which uses a preferred catalyst that comprises a $MoO_3$ concentration of about 1 to 10 wt. %, preferably about 2 to 8 wt. %, and more preferably about 4 to 6 wt. %, based on the total weight of the catalyst, and a CoO concentration of about 0.1 to 5 wt. %, preferably about 0.5 to 4 wt. %, and more preferably about 1 to 3 wt. % based on the total weight of the catalyst. The process includes blending a cracked naphtha feedstream that contains sulfur with a substantially olefin free naphtha feedstream and selectively hydrodesulfurizing the blend in the presence of a hydrodesulfurizing catalyst.

U.S. Pat. Nos. 6,589,418; 6,126,814; and 6,013,598 disclose processes for the selective hydrodesulfurization of an olefin-containing naphtha feedstock that use catalysts that are similar to those disclosed in U. S. Patent Publication No. 2003/0183556.

U.S. Pat. No. 5,286,373 discloses a process for selectively hydrodesulfurizing a naphtha feedstock having a high olefin content by using a deactivated hydrotreating catalyst. The deactivated hydrotreating catalyst is a hydrotreating catalyst that has been deactivated by use or by other means, and it generally contains deposits of coke. The hydrotreating catalyst typically includes Group VI and Group VIII metals, provided on a porous support. The preferred Group VI metals include chromium, molybdenum and tungsten, and the preferred Group VIII metals include cobalt and nickel. Additional metals or other elements can be present, such as phosphorus, fluorine, titanium, boron and the like. The particularly preferred metals include cobalt and molybdenum.

As may be seen from the above review of some of the prior art there is great interest in the development of processes that provide for the selective catalytic hydrodesulfurization of sulfur-containing naphtha or hydrocarbon feedstocks that boil in the gasoline boiling range and contain high olefin contents. By the selective hydrodesulfurization of the sulfur without significant simultaneous hydrogenation of the olefins the loss in octane of the feedstock may be minimized; since, as noted above, olefins tend to be high-octane components of certain gasoline blending components.

It is, thus, an objective of the invention to provide a process that selectively desulfurizes a sulfur-containing hydrocarbon feedstock that has high olefin content.

Thus, in accordance with the invention, provided is a method for the selective hydrodesulfurization of an olefin-containing hydrocarbon feedstock having a concentration of sulfur by contacting the olefin-containing hydrocarbon feedstock under selective hydrodesulfurization conditions with a catalyst composition comprising a porous refractory oxide and a significant nickel concentration of a nickel component and a small concentration of a molybdenum component. In another embodiment, the catalyst composition includes a heat treated shaped mixture of the porous refractory oxide having a first nickel component at a first nickel component concentration and a second nickel component, wherein the significant nickel concentration exceeds 8 weight percent of the catalyst composition. The inventive method may further provide for the yielding of a low sulfur product.

FIG. 1 presents comparative plots of the performance of various hydroprocessing catalyst compositions in the selective hydrodesulfurization of an olefin-containing hydrocarbon feedstock having a sulfur concentration with the percent sulfur removal being shown relative to the percent olefin reduction of the feedstock.

The invention is directed to a method or process for the selective hydrodesulfurization of an olefin-containing hydrocarbon feedstock that has a sulfur concentration. What is meant when referring herein to the selective hydrodesulfurization of a feedstock is that sulfur is removed from the feedstock by the catalytic hydrogenation of the sulfur compounds but with a minimization of the simultaneous hydrogenation of the olefin compounds contained in the feedstock. Refinery cracked feedstocks typically contain high concentrations of sulfur as well as olefins, and it is desirable to be able to selectively desulfurize such cracked feedstocks with a minimum of olefin saturation.

The feedstocks contemplated for use in the inventive method can be a hydrocarbon feedstock that typically boils in the naphtha or gasoline boiling range, which is typically from about 10° C. (50° F.) to about 232.2° C. (450° F.), and, preferably from about 21° C. (70° F.) to about 221° C. (430° F.). More preferably, the hydrocarbon feedstock predominantly boils in the range of from 32° C. (90° F.) to 210° C. (410° F.).

The hydrocarbon feedstock of the inventive process contains both olefin compounds and sulfur compounds. The olefin content or concentration of the hydrocarbon feedstock of the inventive process can be in the range of upwardly to about 60 weight percent of the total weight of the hydrocarbon feedstock and usually at least 5 weight percent of the total weight of the hydrocarbon feedstock comprises olefin compounds. A typical olefin content of the hydrocarbon feedstock is in the range of from 5 weight percent to 55 weight percent of the total weight of the hydrocarbon feedstock, and, more typically, the range is from 8 weight percent to 50 weight percent. It is contemplated, however, that the hydrocarbon feedstock of the inventive selective hydrodesulfurization process can have concentrations of olefin compounds exceeding 10 weight percent and even exceeding 15 or even 20 weight percent.

Generally, the hydrocarbon feedstock is olefin-containing and can be a cracked naphtha product such as products from catalytic or thermal cracking units including, for example, an FCC cracked naphtha product from a conventional fluid catalytic cracking unit, a coker naphtha from either a delayed coker unit or a fluid coker unit, a hydrocracker naphtha and any combination of cracked naphtha products. The cracked naphtha product typically has a high concentration of olefin compounds and may have an undesirably high concentration of sulfur compounds.

The olefin-containing hydrocarbon feedstock of the inventive process can have a significant sulfur content or sulfur concentration that generally is in the range of from about 0.03 weight percent, i.e., 300 parts per million by weight (ppmw), to about 1 weight percent, i.e., 10,000 ppmw. More typically, the sulfur content is in the range of from 500 ppmw to 7000 ppmw, and, most typically, from 1000 ppmw to 5000 ppmw. The sulfur compounds of the olefin-containing hydrocarbon feedstock include organic sulfur compounds, such as, for example, disulfide compounds, thiol compounds, thiophene compounds and benzothiophene compounds. The olefin-containing hydrocarbon feedstock may also contain other hydrocarbon compounds besides paraffin compounds and olefin compounds. The olefin-containing hydrocarbon feedstock may further comprise naphthenes, and, further, comprise aromatics, and, further, comprise other unsaturated compounds, such as, open-chain and cyclic olefins, dienes, and cyclic hydrocarbons with olefinic side chains.

The olefin-containing hydrocarbon feedstock may also contain nitrogen compounds, and if nitrogen compounds are present, at a nitrogen concentration in the range of from about 5 ppmw to about 150 ppmw, and, more typically, in the range of from 20 ppmw to 100 ppmw.

The inventive process provides for the selective removal of sulfur from an olefin-containing hydrocarbon feedstock, having a sulfur concentration, by catalytic hydrodesulfurization. It is understood herein that the references to hydrodesulfurization means that the sulfur compounds of a feedstock are converted by the catalytic hydrogenation of the sulfur compounds to hydrogen sulfide which may then be removed to provide a low sulfur product. It has been discovered that the use of a specifically defined catalyst composition in the hydrodesulfurization of the olefin-containing hydrocarbon feedstock will provide for improvements in the selective hydrodesulfurization of the olefin-containing hydrocarbon feedstock as compared to the use of other conventional hydrotreating catalysts; and, therefore, an important aspect of the inventive process is the use of the particular catalyst composition.

The catalyst composition of the inventive selective hydrodesulfurization process generally comprises a porous refractory oxide, a significant or high concentration of a nickel component, and a small concentration of a molybdenum component. The significant or high concentration of the nickel component of the catalyst composition exceeds 8 weight percent of the total weight of the catalyst composition, with this weight percent being based on elemental nickel regardless of the actual form in which the nickel component is in within the catalyst composition. It is understood, however, that the nickel component may be present in the catalyst composition in a number of possible forms, including, the elemental form, an oxide form, a sulfide form or any combination thereof.

To provide for the desirable selective dehydrogenation properties, the significant nickel concentration of the nickel component of the catalyst composition should exceed 10 weight percent of the catalyst composition, and, preferably, the significant nickel concentration exceeds 12 weight percent. It is most preferred, however, for the significant nickel concentration to exceed 15 weight percent and, it is especially preferred for the significant nickel concentration to exceed 18 weight percent.

The upper limit for the significant nickel concentration may depend upon whether the incremental improvement in catalytic performance obtained by the addition of incremental amounts of nickel to the catalyst composition may be economically justified. Generally, an upper limit for the significant nickel concentration of the nickel component of the catalyst composition is less than about 50 weight percent, but, preferably, the upper limit for the significant nickel concentration is less than 40 weight percent. Most preferably, the upper limit for the significant nickel concentration is less than 30 weight percent. Thus, non-limiting examples of ranges in which is the significant nickel concentration of the nickel component of the catalyst composition may include the range of from 8 weight percent to 50 weight percent, or the range of from 10 weight percent to 40 weight percent, or even the range of from 12 weight percent to 30 weight percent.

It is an important aspect of the inventive process for the catalyst composition to include a particular combination of a high concentration of the nickel component and a catalytically effective concentration, but a small concentration, of a molybdenum component. It has be found that a hydrotreating catalyst of the type having a high concentration of nickel but no molybdenum component can provide for the selective hydrodesulfurization of an olefin-containing feedstock, but the percentage of sulfur that is removed from the olefin-containing feedstock will tend to be low. However, when the catalyst composition contains both a large concentration of a nickel component and a small concentration of a molybdenum component, the combination provides for both a selective hydrodesulfurization of the olefin-containing feedstock and a high percentage of sulfur removal, especially when compared to the sulfur removal that is provided by the use of a hydrotreating catalyst having essentially no molybdenum component.

The small concentration of the molybdenum component of the catalyst composition of the inventive process should not be so high as to provide for an undesirable level of hydrogenation of olefins that are contained in the olefin-containing hydrocarbon feedstock during the hydrodesulfurization treatment of the olefin-containing hydrocarbon feedstock. Thus, the small concentration of molybdenum component in the catalyst composition should be less than 4 weight percent of the total weight of the catalyst composition, with this weight percent being based on elemental molybdenum regardless of the actual form in which the molybdenum component is in within the catalyst composition. It is understood, however, that the molybdenum component may be present in the catalyst composition in a number of possible forms, including, the elemental form, an oxide form, a sulfide form or any combination thereof.

To provide for the desirable higher percentage desulfurization, the small concentration of the molybdenum component of the catalyst composition should be less than 3 weight percent of the catalyst composition, and, preferably, the small molybdenum concentration is less than 2.5 weight percent. More preferably, the small molybdenum concentration of the catalyst composition is less than 2 weight percent, and especially preferred, the concentration is less than 1.5 weight percent.

As mentioned earlier herein, the lower limit to the concentration of the molybdenum component of the catalyst composition should be a catalytically effective concentration that is, in combination with the nickel component, effective in providing for an enhanced sulfur removal from the olefin-containing hydrocarbon feedstock with a minimum of olefin hydrogenation or reduction. This effective concentration of the molybdenum component of the catalyst composition may be as low as 0.01 weight percent (100 ppmw), and, generally, it should exceed 0.1 weight percent (1000 ppmw) of the catalyst composition. It is preferred, however, for the concentration of molybdenum component of the catalyst composition to exceed 0.5 weight percent of the catalyst composition, and, most preferred, the concentration should exceed 1 weight percent. Non-limiting examples of ranges in which the small molybdenum concentration of the molybdenum component of the catalyst composition may include the range of from 0.1 weight percent to 4 weight percent, or the range of from 0.5 weight percent to 3 weight percent, or even the range of from 1 weight percent to 2.5 weight percent.

Another embodiment of the inventive process requires the catalyst composition to have a material absence of a cobalt component. It has been determined that the presence of a cobalt component in an hydrotreating catalyst has the effect of reducing its selectivity toward the desulfurization of an olefin-containing hydrocarbon feedstock; and, thus, it provides for an undesirable amount of olefin saturation. It is therefore desirable for the catalyst composition of the inventive process to have the aforementioned material absence of a cobalt component. This material absence of a cobalt component can be less than about 1 weight percent of the total weight of the catalyst composition, calculated as the cobalt being in the elemental form even though the cobalt component may be in another form. It is preferred for the cobalt component to be present in the catalyst composition at a concentration of less than 0.5 weight percent, and, more preferably, less than 0.1 weight percent. It is most preferred for the catalyst composition to have a substantial absence of a cobalt component, such as, less than 0.01 weight percent, or even less than 0.001 weight percent, or even less than a trace amount of cobalt. It is understood that when referring herein to the material absence of a cobalt component, what is meant is that the amount of cobalt present in the catalyst composition, if any, is such that it does not in a material way negatively affect the selectivity of the catalyst composition toward the desulfurization of an olefin-containing hydrocarbon feedstock.

The porous refractory oxide of the catalyst composition can be any refractory oxide material that has the properties suitable for use as the support component of the catalyst composition. Examples of possible suitable porous refractory oxide materials include silica, magnesia, silica-titania, zirconia, silica-zirconia, titania, silica-titania, alumina, silica-alumina, and alumino-silicate. The alumina can be of various forms, such as, alpha alumina, beta alumina, gamma alumina, delta alumina, eta alumina, theta alumina, boehmite, or mixtures thereof. The preferred porous refractory oxide is amorphous alumina. Among the available amorphous aluminas, gamma alumina is most preferred.

The porous refractory oxide generally has an average pore diameter in the range of from about 50 Angstroms to about 160 Angstroms, preferably, from 70 Angstroms to 150 Angstroms, and, most preferably, from 80 Angstroms to 130 Angstroms. The total pore volume of the porous refractory oxide, as measured by standard mercury porisimetry methods, is in the range of from about 0.2 cc/gram to about 2 cc/gram. Preferably, the pore volume is in the range of from 0.3 cc/gram to 1.5 cc/gram, and, most preferably, from 0.4 cc/gram to 1 cc/gram. The surface area of the porous refractory oxide, as measured by the B.E.T. method, generally exceeds about 100 $m^2$/gram, and it is typically in the range of from about 100 to about 400 $m^2$/gram. As for the pore size distribution of the porous refractory oxide, at least of about 70 percent of the total pore volume is in the pores having diameters in the range of from 70 Angstroms to 150 Angstroms. More typical, at least 80 percent and even 90 percent of the total pore volume is in the pores having diameters in the range of from 70 Angstroms to 150 Angstroms.

Another preferred component of the catalyst composition of the invention includes a phosphorus component. The phosphorus component may be present in the catalyst composition at an effective concentration that is, generally, in the range of from 0.01 weight percent to 5 weight percent of the total weight of the catalyst composition, calculated as elemental phosphorus. It is understood, however, that the phosphorus component may be present in the catalyst composition in any number of possible forms, including, the elemental form, an oxide form, a sulfide form or any combination thereof. A preferred concentration of the phosphorus component in the catalyst composition is in the range of from 0.1 to 4 weight percent and more preferred the phosphorus concentration of the catalyst composition is in the range of from 0.2 to 3 weight percent.

A preferred catalyst composition of the invention should have all the aforedescribed features but which may be defined as further comprising a heat treated shaped mixture of porous refractory oxide and a first nickel component at a first nickel component concentration that is less than about 5 weight percent of the heat treated shaped mixture; a second nickel component, and a catalytically effective concentration but a small concentration of a molybdenum component. The total nickel concentration of the preferred catalyst composition should be a significant or high concentration that can exceed 8 weight percent of the total weight of the preferred catalyst composition based on elemental nickel regardless of its actual form. For a catalyst composition having the best desired properties, the first nickel component concentration in the heat treated shaped mixture is in the range of from or about 0.2 weight percent to or about 4 weight percent; but, preferably, the first nickel component concentration is in the range of from 0.5 weight percent to 3 weight percent and, most preferably, from 0.7 to 2 weight percent.

Concerning the amount of second nickel component overlay in the catalyst composition, it is important for the catalyst composition to have a high enough total or overall nickel concentration, i.e. the sum of the first nickel component and the second nickel component, so as to provide a catalyst composition having the desired properties for the catalyst composition. The amount of second nickel component overlay in the catalyst composition will then be such as to bring the total nickel concentration in the catalyst composition to a significant or high concentration within the ranges as described above.

The catalyst composition may also include, as noted above, a molybdenum component. The molybdenum component may be present in the heat treated shaped mixture used to form the catalyst composition or it may be incorporated into the heat treated shaped mixture as an overlayer component or it may be present both as an overlayer component and in the heat treated shaped mixture. But, regardless of how the molybdenum component is included in the catalyst composition, it is to be present in the catalyst composition in the small concentration ranges as noted above.

It is understood that the use herein of such terms as overlayer or overlay or overlaid or similar type terminology refers to the addition or incorporation of the component into the heat treated shaped mixture.

The catalyst composition of the invention may be prepared by any method known to those skilled in the art that will suitably provide the desired catalyst composition. The preferred method of preparing the catalyst composition includes several steps.

In the first step of preparing the catalyst composition, a porous refractory oxide is mixed with a first nickel component by any suitable means or method for providing a mixture in which the first nickel component is dispersed, preferably homogeneously dispersed, within the mixture with the porous refractory oxide. Many of the possible mixing means that may suitably be used in preparing the mixture of porous refractory oxide and first nickel component are described in detail in Perry's Chemical Engineers' Handbook, Sixth Edition, published by McGraw-Hill, Inc., at pages 19-14 through 19-24, which pages are incorporated herein by reference. Thus, possible suitable mixing means can include, but are not limited to, such devices as tumblers, stationary shells or troughs, Muller mixers, which are either batch type or continuous type, impact mixers, and any other mixer or device known to those skilled in the art and that will suitably provide the homogeneous mixture of porous refractory oxide and nickel component.

To achieve the desired dispersion of the materials in the mixture, the materials are mixed until the components are substantially homogeneously dispersed. The mixing time is that which is sufficient to give a uniform mixture generally exceeding about 2 minutes and extending upwardly to as much as 45 minutes or even longer. The mixture is then formed into an agglomerate that is to be heat treated to provide the heat treated shaped mixture of porous refractory oxide and the first nickel component prior to the incorporation therein of additional components such as the second nickel component and molybdenum component and phosphorous component.

Any suitable method or means for forming the agglomerate can be used, including, for example, molding, tableting, pressing, pelletizing, tumbling, densifying, and extruding. Extrusion methods are preferred.

It is a preferred embodiment of the invention for the mixture to be formed by co-mulling the porous refractory oxide and first nickel component to thereby form a homogeneous mixture thereof. It is especially preferred to form an extrudable paste of the porous refractory oxide and first nickel component that is agglomerated into an extrudate by using any suitable method known to those skilled in the art to extrude an extrudable paste through an extrusion die having openings of desired size and shape and cutting the extrudate to desired lengths. To form the extrudable paste, water and a dilute acid is added to the mixture of porous refractory oxide and first nickel component during co-mulling thereof. The water and dilute acid are added in such amounts and by such methods as are required to give the extrudable paste of desired consistency. Any acid that suitably assists in providing the extrudable paste may be used including, for example, nitric acid, acetic acid, sulfuric acid, and hydrochloric acid, with nitric acid or acetic acid being preferred.

The nickel compounds that can be used in forming the mixture with the porous refractory oxide are those compounds providing for the desired catalytic properties as described herein and which are selected from the group of compounds including elemental nickel, nickel acetates, nickel carbonates, nickel nitrates, nickel sulfates, and nickel thiocyanates. The preferred first Group VIII metal compound is nickel nitrate. The amount of nickel compound introduced into the mixture will be such as to provide for a desired first nickel concentration in the heat treated shaped mixture.

The shaped agglomerate of the mixture is heat treated to provide the heat treated shaped mixture. This heat treatment step can include a drying step before the required calcination step. The temperature range at which the shaped agglomerate is dried is from about 65° C. (150° F.) to about 260° C. (500° F.). Preferably, the drying temperature is in the range of from 88° C. (190° F.) to 232° C. (450° F.). The shaped agglomerate may be dried for a drying time period generally in the range of from about 0.5 hours to about 8 hours or until the amount of moisture in the shaped agglomerate has reached the desired level. The shaped agglomerate may be dried in the presence of oxygen, an inert gas, air or mixtures thereof.

The thus dried shaped agglomerate is calcined in the presence of oxygen or an oxygen-containing inert gas or air. The temperature at which the shaped agglomerate is calcined is generally in the range of from 371° C. (700° F.) to about 760° C. (1400° F.). Preferably, the calcination temperature is in the range of from 482° C. (900° F.) to 732° C. (1350° F.), and, more preferably, it is from 510° C. (950° F.) to 704° C. (1300° F.). The time for conducting the calcination is that which is required to remove the volatile matter and to convert substantially all the nickel compound contained in the shaped agglomerate to the form of nickel oxide. The time required for the calcination is generally in the range of from about 0.5 hours to about 4 hours.

The heat treated shaped mixture is provided with an overlay of a second nickel component by incorporating the second nickel component into the heat treated shaped mixture. As defined above, when referring herein to an overlayer of metal in the catalyst composition, what is meant is that the metal overlayer results from the deposition of additional metal onto a heat treated agglomerate of a mixture of porous refractory oxide already having incorporated therein another metal.

To form the second nickel component overlayer, it is preferred to use an impregnation procedure to impregnate the heat treated shaped mixture to provide an impregnated agglomerate. Any impregnation procedure or method that suitably provides for the overlayer of second nickel component in the heat treated shaped mixture at the required concentration levels can be used. Such impregnation methods include, for example, spray impregnation, soaking, multi-dip procedures, and incipient wetness impregnation methods. The heat treated shaped mixture is thus provided with an overlayer of the second nickel component by contacting the heat treated shaped mixture with an impregnation solution comprising a second nickel compound thereby providing the impregnated agglomerate. The impregnated agglomerate is then heat treated using the same methods and under the same conditions as are described above in detail for the heat treatment of the shaped agglomerate.

The impregnation solution can generally comprise the second nickel compound dissolved in a suitable liquid solvent, such as water, alcohol or liquid hydrocarbon, for incorporating into the heat treated shaped mixture the second nickel compound by any of the impregnation methods noted above. The second nickel compounds used in the impregnation solution can include, for example, nickel acetates, nickel carbonates, nickel nitrates, nickel sulfates, nickel thiocyanates and mixtures of any two or more thereof. The preferred impregnation solution is an aqueous solution of a second nickel compound that is soluble in water. Such a impregnation solution includes nickel nitrate dissolved in water. The concentration of the second nickel compound in the impregnation solution is selected so as to provide the desired metal concentration in the catalyst composition intermediates or the final catalyst compositions of the invention. Typically, the concentration of the second nickel compound in the impregnation solution is in the range of from 0.01 to 100 moles per liter.

The catalyst composition can further include an overlayer of a molybdenum component. This embodiment of the catalyst composition is prepared by using any of the aforementioned impregnation means or methods to incorporate into the heat treated shaped mixture the molybdenum component.

The impregnation solution can further comprise a molybdenum compound. The molybdenum compounds used in the impregnation solution can include, for example, elemental molybdenum, molybdenum oxides, molybdenum acetates, molybdenum carbonates, molybdenum nitrates, molybdenum sulfates, molybdenum thiocyanates and mixtures of any two or more thereof. The preferred molybdenum compound is soluble in water. The concentration of the molybdenum compound in the impregnation solution is selected so as to provide the desired metal concentration in the catalyst composition intermediates or the final catalyst compositions of the invention. Typically, the concentration of the molybdenum compound in the impregnation solution is in the range of from 0.01 to 100 moles per liter.

The molybdenum component may also be incorporated into the heat treated shaped mixture by a separate impregnation step.

The catalyst compositions as described herein are especially useful in the selective hydrodesulfurization of an olefin-containing hydrocarbon feedstock having a first sulfur concentration and a first olefin concentration. As noted above, it has been found that the particularly described catalyst compositions can provide for improved selectivity toward the hydrodesulfurization of an olefin-containing feedstock as compared to the use other hydrotreating-type catalysts. In particular, it is the use of a catalyst composition specifically having high nickel content with a small but effective molybdenum concentration, and, preferably, other components and features that provide for the distinctive selective hydrodesulfurization benefits of the inventive process.

The inventive selective hydrodesulfurization process includes contacting, under selective hydrodesulfurization conditions, an olefin-containing hydrocarbon feedstock as described herein with a catalyst composition as described herein, and, preferably, yielding a low sulfur product that has a sulfur concentration much reduced below the sulfur concentration of the olefin-containing hydrocarbon feedstock. The inventive process can provide for a sulfur reduction in an amount greater than 20 weight percent of the sulfur contained in the olefin-containing hydrocarbon feedstock while causing less than a 25 weight percent olefin reduction by the catalytic hydrogenation of the olefin compounds contained in the olefin-containing hydrocarbon feedstock to yield the low sulfur product.

While the sulfur reduction of at least 20 weight percent with less than a 25 weight percent olefin compound reduction is a reasonably selective hydrodesulfurization of an olefin-containing feedstock, it is desirable for the process to be more selective in the hydrodesulfurization of the feedstock by providing for a higher percentage of sulfur reduction but with a lower percentage of olefin reduction. It is, thus, desirable for the desulfurization to provide for a sulfur reduction of at least 30 weight percent and even at least 35 weight percent. Preferably, the sulfur reduction is at least 40 weight percent, and, more preferably, the sulfur reduction is at least 50 weight percent. Most preferably, the sulfur reduction is greater than 60 weight percent.

Because a highly selective desulfurization process provides for a high percentage of sulfur removal with a low percentage of olefin removal by the hydrogenation of the olefin compounds in the feedstock to saturated compounds, in each of the instances noted above with respect to the sulfur reduction it is desirable for the olefin reduction to be minimized with the weight percent olefin reduction being less than 15 weight percent. Preferably, the weight percent olefin reduction is less than 10 weight percent, and, most preferably, the weight percent olefin reduction is less than 5 weight percent.

When referring herein to the weight percent sulfur reduction of the sulfur contained in the olefin-containing hydrocarbon feedstock what is meant is that the weight percent sulfur reduction is the ratio of the difference between the weight of sulfur in the feedstock and the weight of sulfur in the yielded product divided by the weight of sulfur in the feedstock with the ratio being multiplied by the number one-hundred (100).

When referring herein to the weight percent olefin reduction of the olefin compounds contained in the olefin-containing hydrocarbon feedstock what is meant is that weight percent olefin reduction is the ratio of the weight of the olefin compounds in the feedstock that are hydrogenated to saturated compounds divided by the weight of olefin compounds in the feedstock with the ratio being multiplied by the number one-hundred (100). The olefin compounds hydrogenated to saturated compounds is defined as being the difference between the weight of olefin compounds in the feedstock and the olefin compounds in the yielded product.

The catalyst composition of the invention may be employed as a part of any suitable reactor system that provides for the contacting of the catalyst composition with the hydrocarbon feedstock under suitable selective hydrodesulfurization reaction conditions that can include the presence of hydrogen and an elevated temperature and total pressure.

Such suitable reactor systems can include fixed catalyst bed systems, ebullating catalyst bed systems, slurried catalyst systems, and fuidized catalyst bed systems. The preferred reactor system is that which includes a fixed bed of the catalyst composition contained within a reactor vessel equippred with a reactor feed inlet means, such as a feed inlet nozzle, for introducing the hydrocarbon feedstock into the reactor vessel, and a reactor effluent outlet means, such as an effluent outlet nozzle, for withdrawing the reactor effluent or low sulfur product from the reactor vessel.

The selective hydrodesulfurization reaction temperature is generally in the range of from about 150° C. (302° F.) to 420° C. (788° F.). The preferred selective hydrodesulfurization reaction temperature is in the range of from 175° C. (347° F.) to 400° C. (752° F.), and, most preferred, from 200° C. (392° F.) to 380° C. (716° F.).

The inventive process generally operates at a selective hydrodesulfurization reaction pressure in the range of from about 50 psia to about 1000 psia, preferably, from 60 psia to 800 psia, and, most preferably, from 150 psia to 700 psia.

The flow rate at which the hydrocarbon feedstock is charged to the reaction zone of the inventive process is generally such as to provide a weight hourly space velocity (WHSV) in the range exceeding $0\,hr^{-1}$ such as from about $0.1\,hr^{-1}$ upwardly to about $10\,hr^{-1}$. The term "weight average space velocity", as used herein, means the numerical ratio of the rate at which the hydrocarbon feedstock is charged to the reaction zone of the process in pounds per hour divided by the pounds of catalyst composition contained in the reaction zone to which the hydrocarbon feedstock is charged. The preferred WHSV is in the range of from $0.1\,hr^{-1}$ to $250\,hr^{-1}$, and, most preferred, from $0.5\,hr^{-1}$ to $5\,hr^{-1}$.

The hydrogen treat gas rate is the amount of hydrogen charged to reaction zone with the hydrocarbon feedstock. The amount of hydrogen relative to the amount of hydrocarbon feedstock charged to the reaction zone is in the range upwardly to about 10,000 cubic meters hydrogen per cubic meter of hydrocarbon feedstock, but, typically, it is in the range of from 10 to 10,000 $m^3$ hydrogen per $m^3$ hydrocarbon feedstock. The preferred range for the hydrogen-to-hydrocarbon feed ratio is from 20-400 and, most preferred, from 20 to 200.

The following examples are presented to further illustrate the invention, but they are not to be construed as limiting the scope of the invention.

EXAMPLE 1

This Example 1 describes the catalysts used in the selective hydrodesulfurization experiments described in Example 2. Catalysts A and B are commercially available hydrotreating catalysts, as described below, and Catalyst C is a specially prepared catalyst of which the preparation thereof is described below.

Catalyst A

Catalyst A is a catalyst composition commercially available from Criterion Catalyst Company designated as Criterion catalyst DC-130 having 3.4 weight percent cobalt and 13.6 weight percent molybdenum on an alumina support and further having a surface area of 235 $m^2/g$ and a water pore volume of 0.53 cc/g.

Catalyst B

Catalyst B is a catalyst composition commercially available from Criterion Catalyst Company designated as Criterion 448 having 3.1 weight percent cobalt and 12.4 weight percent molybdenum and further having a surface area of 265 $m^2/g$ and a water pore volume of 0.54 cc/g.

Catalyst C

A support was prepared by co-mulling for 40 minutes 3,984 g of wide pore alumina and an aqueous nickel nitrate solution comprising 153 g of nickel nitrate in 3,225 g of deionized water. The resulting mulled mixture was extruded through a 1.3 Trilobe™ die plate, dried at 125° C. and then calcined at 482° C. The resulting support comprised alumina and 1 wt % nickel.

691 g of the support was impregnated with 335 g of $Ni(NO_3)_2 \cdot 6H_2O$ dissolved in 574 ml of deionized water, aged for 2 hours with occasional agitation, dried at 100° C. for 3 hours and then calcined at 482° C. for 2 hours. The resulting calcined, impregnated support was further impregnated with a second impregnation solution prepared as follows.

Two solutions were prepared and combined to form the second impregnation solution:

Solution #1 was made by combining 180.6 g of $(NH_4)_2Mo_2O_7$, 49.5 g of $MoO_3$, 35.4 g of 30% $H_2O_2$, 8.7 g of monoethanolamine (MEA) and 147.1 g of deionized water, heating the mixture to 65° C. to dissolve and then cooling to room temperature.

Solution #2 was made by combining 75.9 g of $Ni(NO_3)_2 \cdot 6H_2O$ and 30.1 g of $NiCO_3$ with 100 g of deionized water and then adding 72.4 g of an 85% solution of $H_3PO_4$.

Solutions #1 and #2 were combined and sufficient deionized water added to bring the combined solution volume up to 540 ml to give the second impregnation solution. 750 g of the calcined impregnated support was impregnated with the combined solution, aged for 2 hours with occasional agitation, dried at 100° C. overnight and then calcined at 452° C. for 2 hours. The resulting catalyst is designated in these Examples as "Catalyst C." Analysis of Catalyst C showed that its composition was 9.4 wt % Ni, 12.2 wt % Mo, and 1.9 wt % P with the balance being alumina.

EXAMPLE 2

This Example 2 describes the experimental procedure used to measure the performance of the catalyst compositions described in the above Example 1 in the selective hydrodesulfurization of an olefin-containing hydrocarbon feedstock having a concentration of sulfur without an excessive simultaneous hydrogenation of the olefin compounds in the hydrocarbon feedstock.

A laboratory stainless steel isothermal tube reactor, having a nominal diameter of ¾ inch, was packed with a volume of the relevant catalyst (either Catalyst A, Catalyst B, or Catalyst C). The catalyst was supported by a layer 20 mesh silicon carbide and on top of the catalyst bed was placed a layer of 20 mesh silicon carbide. The catalyst was sulfided prior to passing the feed over it at hydrotreatment conditions. A catalytically cracked gasoline feed, having a bromine number of 28, a total sulfur content of 154 ppm, an initial boiling point and a final boiling point respectively of 56.1° C. (133° F.) and 247.8° C. (478° F.), and an octane number ((R+M)/2) of 81.4, was passed over the catalyst at isothermal operating temperatures ranging from 246.1° C. (475° F.) to 315.6° C. (600° F.), a liquid hourly space velocity (for hydrocarbon feed) of 10 $hr^{-1}$, a gaseous hourly space velocity (for hydrogen gas rate) of 200 $hr^{-1}$, and a pressure of 310 psig for each of the reactor runs.

Presented in Table 1 is a summary of the results from the reactor runs described above showing the percent sulfur removal relative to the percent olefin removal for each of the reactor runs. These results are also presented in FIG. 1 to assist in illustrating the improvements in the selective desulfurization of an olefin-containing feedstock that is provided by the inventive process over other comparative processes.

TABLE 1

Selective Desulfurization Test Results

| Catalyst | Temp ° C. (° F.) | % Sulfur Removal (%) | Bromine Number Reduction (%) |
|---|---|---|---|
| Catalyst A | 246 (475) | 47 | 35 |
|  | 274 (525) | 78 | 41 |
| Catalyst B | 246 (475) | 49 | 30 |
|  | 274 (525) | 77 | 33 |
| Catalyst C | 246 (475) | 22 | 3 |
|  | 274 (525) | 40 | 3 |
|  | 302 (575) | 63 | 5 |

The above presented data show that the inventive process, which uses the catalyst composition having a high nickel concentration with a small molybdenum concentration and an immaterial cobalt concentration, provides for a high percentage of sulfur removal with a very low percentage of olefin reduction relative to other processes using different catalysts. Catalysts A and B, which both contained a combination of cobalt and molybdenum supported on alumina, provided for a significant percentage of sulfur removal; however, they also provided for an unacceptably high olefin reduction of around 30 weight percent or greater.

It is understood that while particular embodiments of the invention have been described herein, reasonable variations, modifications and adaptations thereof may be made that are within the scope of the described disclosure and the appended claims without departing from the scope of the invention as defined by the claims.

That which is claimed is:

1. A method for the selective hydrodesulfurization of a hydrocarbon feedstock containing at least 5 weight percent up to about 60 weight percent olefins and from 300 ppmw to 10,000 ppmw sulfur, said method comprises:

Contacting under selective hydrodesulfurization conditions said olefin and sulfur-containing hydrocarbon feedstock with a catalyst composition comprising a heat treated shaped mixture of a porous refractory oxide and a first nickel component at a first nickel component concentration of less than about 5 weight percent of said heat treated shaped mixture; a second nickel component overlayed on said heat treated shaped mixture; wherein said catalyst composition has a total nickel concentration that exceeds about 8 weight percent of said catalyst composition; a small but catalytically effective concentration of a molybdenum component of less than 3 weight percent; and a phosphorous concentration of from 0.01 to 5 weight percent; to thereby selectively hydrodesulfurize said hydrocarbon feedstock to provide a sulfur reduction of at least 20 weight percent with an olefin reduction of less than 25 weight percent, to yield a low sulfur product.

2. A method for the selective hydrodesulfurization of a naphtha feedstock containing a olefin concentration of at least 5 weight percent and a sulfur concentration, wherein said method comprises contacting said naphtha feedstock under selective hydrodesulfurization conditions with a catalyst composition comprising a porous refractory oxide, a significant total nickel concentration of a nickel component in excess of 10 weight percent and a small concentration of a molybdenum component of less than 2.5 weight percent; to thereby selectively hydrodesulfurize said naphtha feedstock to provide a sulfur reduction of at least 30 weight percent with an olefin reduction of less than 15 weight percent, to yield a low sulfur naphtha product.

3. A method as recited in claim 2, wherein said catalyst composition further comprises: a heat treated shaped mixture of said porous refractory oxide and a first nickel component wherein said heat treated shaped mixture has a first nickel component concentration; and a second nickel component overlayed on said heat treated shaped mixture; wherein said significant total nickel concentration exceeds 12 weight percent of said catalyst composition and said small concentration of the molybdenum component is less than 2 weight percent.

4. A method as recited in claim 2, wherein said catalyst composition further includes a material absence of a cobalt component.

5. A method as recited in claim 1, wherein the total nickel concentration exceeds about 12 weight percent of said catalyst composition and the concentration of said molybdenum component is less than 2.5 weight percent.

6. A method as recited in claim 5, wherein the total nickel concentration exceeds about 15 weight percent of said catalyst composition and the concentration of said molybdenum component is less than 2.0 weight percent.

7. A method as recited in claim 6, wherein said weight percent sulfur reduction exceeds 30 weight percent and said olefin reduction is less than 15 weight percent.

8. A method as recited in claim 7, wherein the total nickel concentration exceeds about 18 weight percent of said catalyst composition and the concentration of said molybdenum component is less than 1.5 weight percent.

9. A method as recited in claim 8, wherein said weight percent sulfur reduction exceeds 40 weight percent and said olefin reduction is less than 10 weight percent.

* * * * *